United States Patent
Rollins et al.

(10) Patent No.: US 9,488,139 B2
(45) Date of Patent: Nov. 8, 2016

(54) AIR INTAKE DUCT ICE INGESTION FEATURES

(71) Applicant: Ford Global Technologies, LLC, Dearborn, MI (US)

(72) Inventors: Scott M. Rollins, Canton, MI (US); Christopher B. Bishop, South Lyon, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/068,393

(22) Filed: Mar. 11, 2016

(65) Prior Publication Data

US 2016/0195046 A1    Jul. 7, 2016

Related U.S. Application Data

(62) Division of application No. 13/968,306, filed on Aug. 15, 2013, now Pat. No. 9,316,183.

(51) Int. Cl.

| | |
|---|---|
| *F02M 25/06* | (2016.01) |
| *F02M 35/10* | (2006.01) |
| *F02M 25/08* | (2006.01) |
| *F02B 39/16* | (2006.01) |
| *F01M 13/02* | (2006.01) |
| *F02M 35/08* | (2006.01) |
| *F01M 13/00* | (2006.01) |
| *F02B 37/00* | (2006.01) |
| *F02M 35/02* | (2006.01) |
| *F02M 35/04* | (2006.01) |

(52) U.S. Cl.
CPC ........ *F02M 35/10118* (2013.01); *F01M 13/00* (2013.01); *F01M 13/022* (2013.01); *F02B 39/16* (2013.01); *F02M 25/06* (2013.01); *F02M 25/0836* (2013.01); *F02M 35/088* (2013.01); *F02M 35/10019* (2013.01); *F02M 35/10157* (2013.01); *F02M 35/10222* (2013.01); *F02M 35/10262* (2013.01); *F01M 2013/0038* (2013.01); *F01M 2013/027* (2013.01); *F02B 37/00* (2013.01); *F02M 35/0216* (2013.01); *F02M 35/046* (2013.01); *Y02T 10/121* (2013.01); *Y02T 10/144* (2013.01); *Y02T 10/146* (2013.01)

(58) Field of Classification Search
CPC . F02M 35/10222; F02M 25/06; F01M 13/02
USPC .......................... 123/572–574, 585, 184.21
See application file for complete search history.

(56) References Cited

U.S. PATENT DOCUMENTS

| | | |
|---|---|---|
| 3,998,048 A | 12/1976 | Derue |
| 5,114,100 A | 5/1992 | Rudolph et al. |

(Continued)

FOREIGN PATENT DOCUMENTS

WO    2012157113 A1    11/2012

*Primary Examiner* — John Kwon
(74) *Attorney, Agent, or Firm* — Julia Voutyras; Alleman Hall McCoy Russell & Tuttle LLP

(57) ABSTRACT

An engine system including an air intake duct positioned upstream of an engine cylinder may include an ice ingestion feature for retaining condensation. An ice ingestion feature may include indents formed in the bottom of an air intake duct wall. As such, the ice ingestion feature may include compartments and/or grooves of varying depths, widths, and/or angles such that the ice retention rate may be based on the surface area of the compartment or grooves.

20 Claims, 11 Drawing Sheets

(56) References Cited

U.S. PATENT DOCUMENTS

| | | | |
|---|---|---|---|
| 5,697,394 A * | 12/1997 | Smith | B64D 33/02 137/15.1 |
| 6,601,572 B2 | 8/2003 | Okamoto | |
| 6,782,878 B2 | 8/2004 | Spix | |
| 6,814,051 B2 | 11/2004 | Suzuki | |
| 7,845,341 B2 | 12/2010 | Lewis et al. | |
| 8,205,604 B2 | 6/2012 | Velosa et al. | |
| 8,267,073 B2 | 9/2012 | Kado et al. | |
| 9,074,563 B2 | 7/2015 | Rollins et al. | |
| 2004/0040536 A1 | 3/2004 | Suzuki | |
| 2015/0040877 A1 * | 2/2015 | Rollins | F02M 35/10222 123/572 |
| 2015/0047615 A1 * | 2/2015 | Rollins | F02M 25/0836 123/520 |

* cited by examiner deredAIR INTAKE DUCT ICE INGESTION FEATURES

CROSS REFERENCE TO RELATED APPLICATIONS

The present application is a divisional of U.S. patent application Ser. No. 13/968,306, entitled "AIR INTAKE DUCT ICE INGESTION FEATURES," filed on Aug. 15, 2013, the entire contents of which are hereby incorporated by reference for all purposes.

FIELD

The present invention relates to an engine system having an ice ingestion feature.

BACKGROUND AND SUMMARY

Positive crankcase ventilation (PCV) vapor contains a large fraction of water. The water vapor can condense on the cold air duct walls and the interior of the intake manifold walls. Further, the PCV vapor may freeze into ice downstream of the PCV port in the cold air duct. Following a day/night cycle, the ice melt may drip and/or drain down to the lowest spot of the intake system and re-freeze. Once the engine is restarted, blow by flow moving downstream to the turbocharger or throttle body may dislodge the ice and move it downstream causing the icicle to be ingested by the turbocharger or throttle body. Dislodging of the ice may result in turbocharger blade damage or blocked throttle bodies thereby creating noise, vibration, and harshness (NVH) and/or lack of power in the engine.

Patent WO2012157113 describes an approach with the use of a capture member in an intake structure upstream of a compressor impeller. The capture member includes a circular mesh plate formed in an intake passage to capture ice formed in a blow-by gas passage.

The inventors herein have recognized the above issues as well as issues with approaches such as described in WO2012157113. For example, accumulation of ice on the mesh plate may limit the amount of airflow into the compressor, thereby reducing the efficiency of the engine. Further, the mesh plate may not capture all of the condensate and engine operation may be reduced due to condensation in the intake air.

In one example, some of the above issues may be addressed by an engine air intake duct, comprising an air intake duct wall including an ice ingestion feature positioned at a bottom of an engine air intake duct wall and a positive crankcase ventilation outlet coupled to the air intake duct wall upstream from the ice ingestion feature. Further, the ice ingestion feature may be formed by a plurality of indents where at least two indents contain a different volume. In this way, it is possible to retain positive crankcase ventilation condensation. Further, the condensation may be retained in the ice ingestion feature based on an ice retention rate determined by the geometry of the indents.

In another example, a method for retaining ice in an air intake duct, comprising flowing crankcase gas from a PCV port to an air intake duct upstream of an engine cylinder and collecting condensate in a plurality of indents positioned in a bottom wall of an air intake duct. Further, the method includes collecting condensate in the indents (e.g. compartments), thawing them during engine operation at different rates, and ingesting water from the compartments at different engine cycles. In this way, the condensation may be more slowly ingested by the compressor without damage to the impeller blades or blocking the throttle plate from closing.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION OF THE DRAWINGS

Figure 10A:
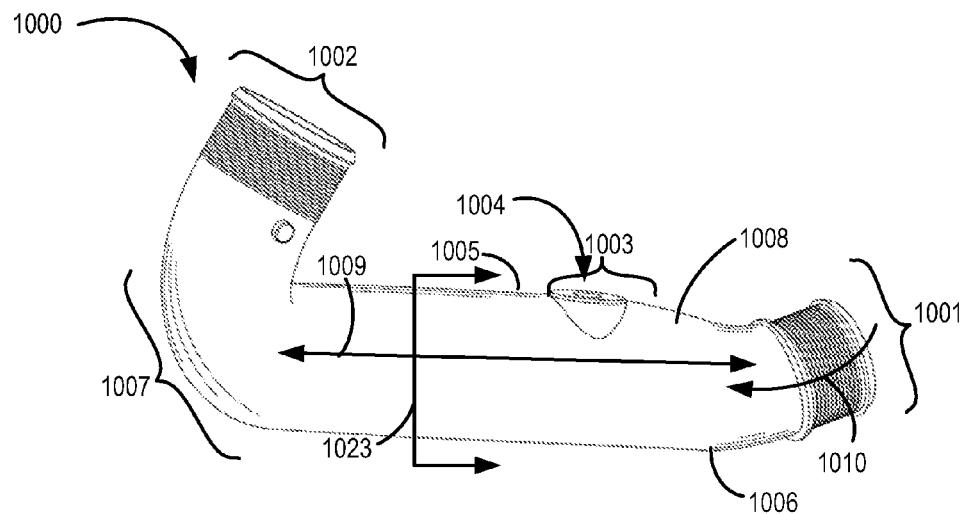
Figure 10B:
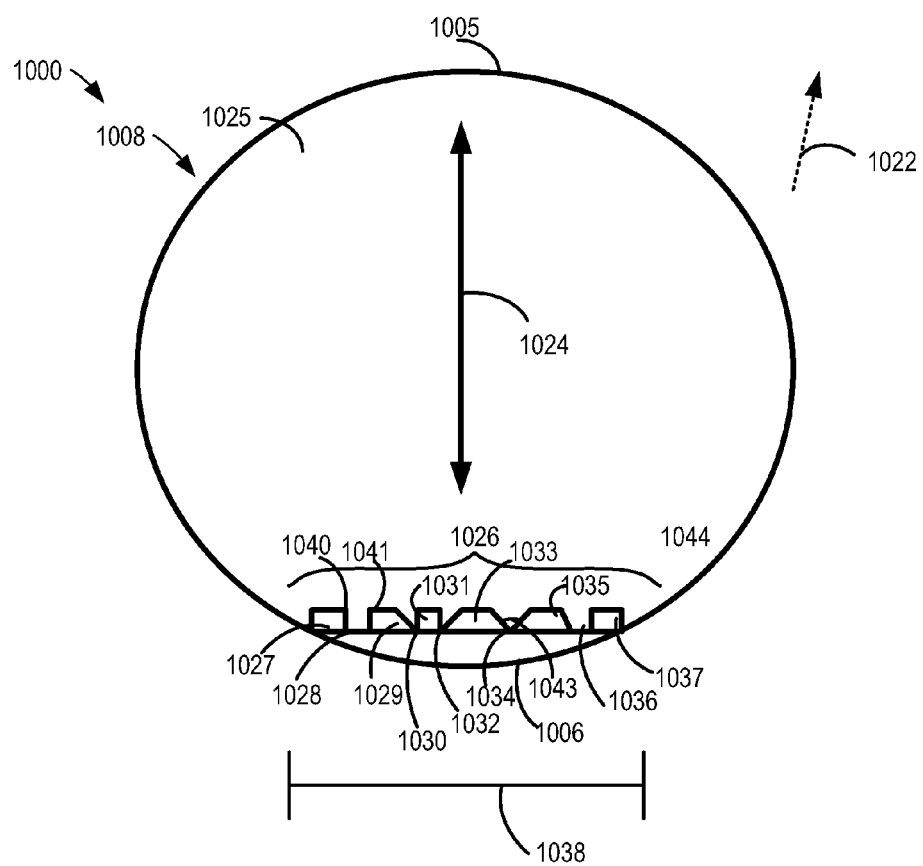

FIG. 10A-B shows a schematic diagram of a cold air intake duct assembly including an ice ingestion feature with a plurality of grooves.

Figure 11:
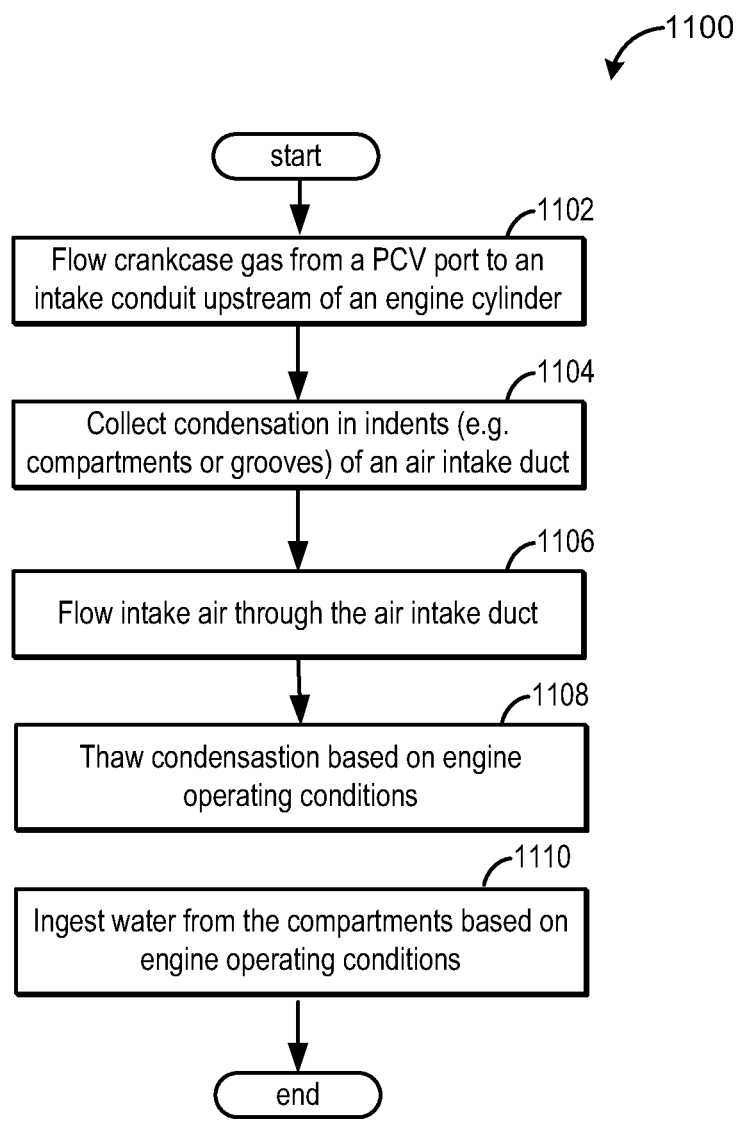

FIG. 11 shows an example method for retaining ice in an air intake duct. FIGS. 2-11 are drawn approximately to scale, although other relative dimensions may be used, if desired.

DETAILED DESCRIPTION

Figure 2:
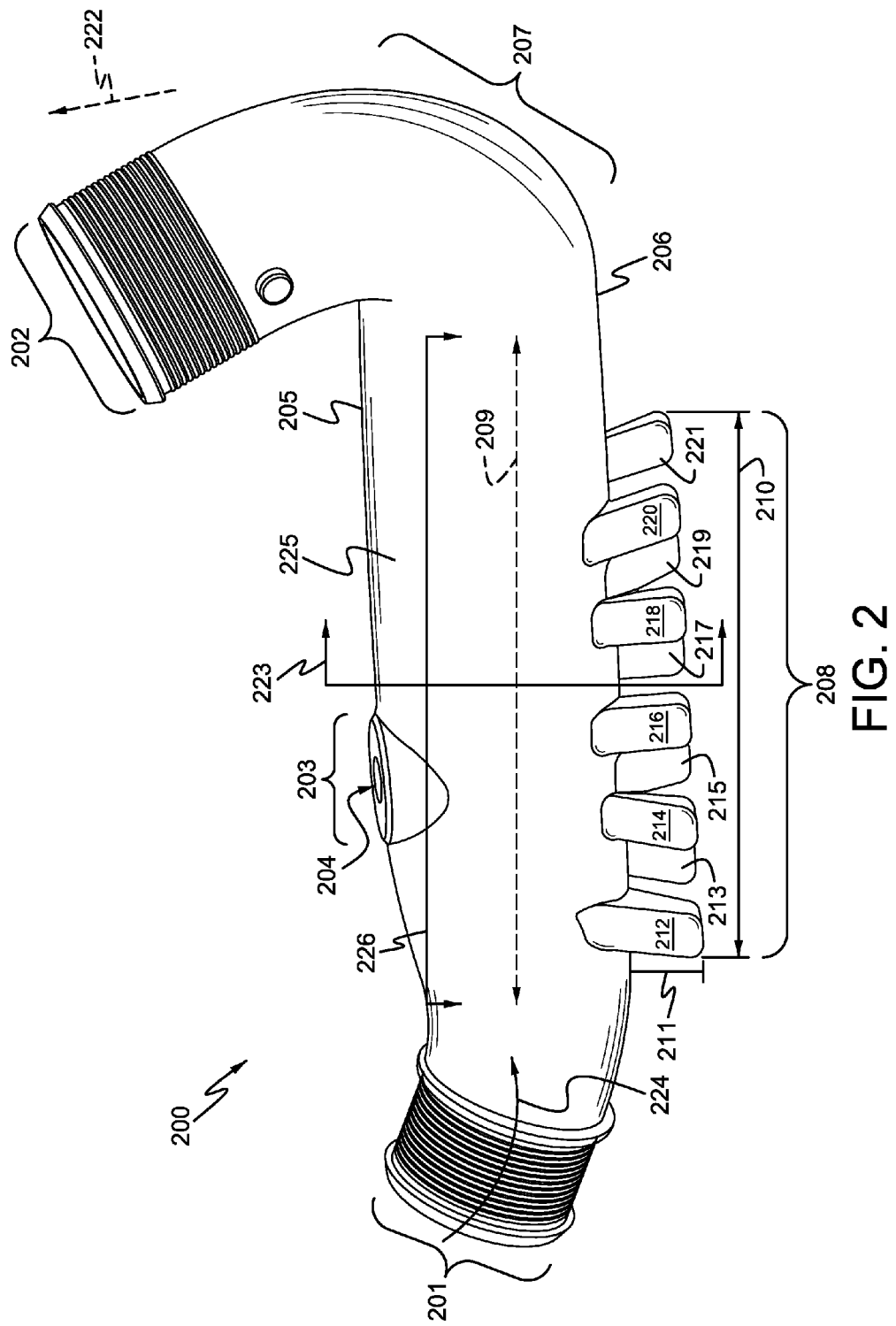
FIG. 2 shows a schematic diagram of a cold air intake duct assembly including an ice ingestion feature with a plurality of compartments.

A system for an engine having a cold air intake duct including an ice ingestion feature upstream of an engine cylinder is described herein. A cold air intake may include an ice ingestion feature in order to reduce effects of positive crankcase ventilation (PCV) condensation (e.g. water or ice) on downstream engine components such as a compressor and/or throttle body. Condensation from the PCV may accumulate at a low area of a cold air intake. As such, an ice ingestion feature may be positioned in a cold air intake downstream of a PCV port (FIG. 2). Further, an ice ingestion feature may be formed in a cold air intake duct such that the ice ingestion feature includes compartments (FIGS. 2-9) or grooves (FIGS. 10A-B) for trapping PCV condensation. Additionally, the condensation retention rate (e.g. the amount of time the ice remains in the ice ingestion feature) may be variable depending on differences in the widths, depths, and/or angles of the compartments and/or grooves positioned in the ice ingestion feature (FIGS. 2-10). In this way, the amount of PCV condensation ingested downstream of a cold air intake is limited over time, thereby increasing the lifespan of the compressor and/or throttle body of an engine (as illustrated in the method of FIG. 11).

Figure 1:
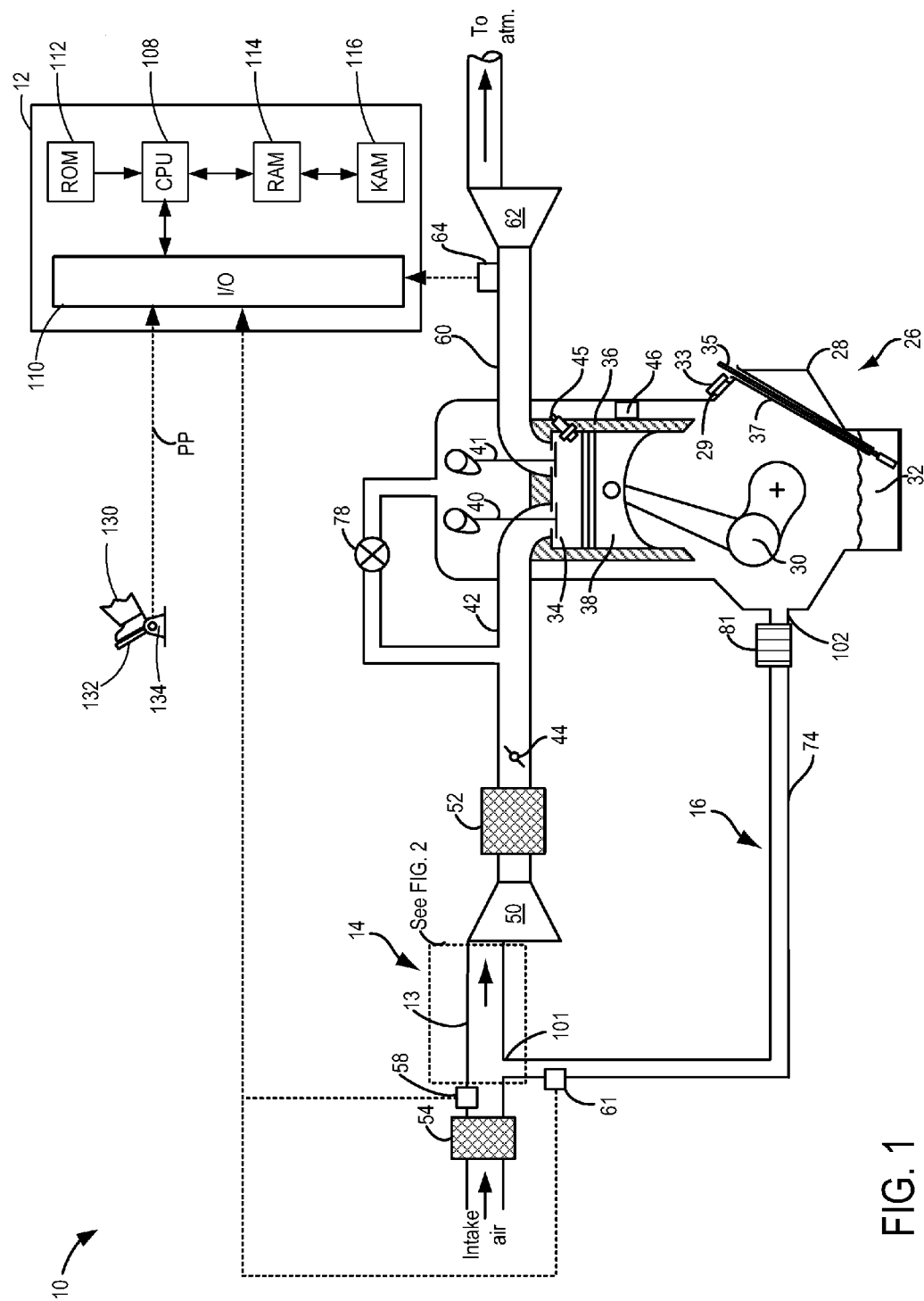
FIG. 1 shows a schematic diagram of an example engine system including a cold air intake system.

Referring now to FIG. 1, an example system configuration of a multi-cylinder engine, generally depicted at 10, which may be included in a propulsion system of an automobile, is shown. Engine 10 may be controlled at least partially by a control system including engine controller 12 and by input from a vehicle operator 130 via an input device 132. In this example, input device 132 includes an accelerator pedal and a pedal position sensor 134 for generating a proportional pedal position signal PP.

Engine 10 may include a lower portion of the engine block, indicated generally at 26, which may include a crankcase 28 encasing a crankshaft 30. Crankcase 28 contains gas and may include an oil sump 32, otherwise referred to as an oil well, holding engine lubricant (e.g., oil) positioned below the crankshaft. An oil fill port 29 may be disposed in crankcase 28 so that oil may be supplied to oil well 32. Oil fill port 29 may include an oil cap 33 to seal oil fill port 29 when the engine is in operation. A dip stick tube 37 may also be disposed in crankcase 28 and may include a dipstick 35 for measuring a level of oil in oil sump 32. In addition, crankcase 28 may include a plurality of other orifices for servicing components in crankcase 28. These orifices in crankcase 28 may be maintained closed during engine operation so that a crankcase ventilation system (described below) may operate during engine operation.

The upper portion of engine block 26 may include a combustion chamber (e.g., cylinder) 34. The combustion chamber 34 may include combustion chamber walls 36 with piston 38 positioned therein. Piston 38 may be coupled to crankshaft 30 so that reciprocating motion of the piston is translated into rotational motion of the crankshaft. Combustion chamber 34 may receive fuel from fuel injector 45 (configured herein as a direct fuel injector) and intake air from intake manifold 42 which is positioned downstream of throttle 44. The engine block 26 may also include an engine coolant temperature (ECT) sensor 46 input into an engine controller 12 (described in more detail below herein).

A throttle 44 may be disposed in the engine intake to control the airflow entering intake manifold 42 and may be preceded upstream by compressor 50 followed by charge air cooler 52, for example. An air filter 54 may be positioned upstream compressor 50 and may filter fresh air entering intake passage 13. In one example, intake passage 13 may include a cold air intake duct or conduit, as indicated via arrow 14. A Cold air intake duct may include a positive crankcase ventilation (PVC) port downstream from the cold air intake duct inlet, as described further below with reference to FIG. 2. Further, a cold air intake duct may be coupled to compressor 50.

The intake air may enter combustion chamber 34 via cam-actuated intake valve system 40. Likewise, combusted exhaust gas may exit combustion chamber 34 via cam-actuated exhaust valve system 41. In an alternate embodiment, one or more of the intake valve system and the exhaust valve system may be electrically actuated.

Exhaust combustion gases exit the combustion chamber 34 via exhaust passage 60 located upstream of turbine 62. An exhaust gas sensor 64 may be disposed along exhaust passage 60 upstream of turbine 62. Turbine 62 may be equipped with a wastegate bypassing it. Exhaust gas sensor 64 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust gas sensor 64 may be connected with engine controller 12.

In the example of FIG. 1 a positive crankcase ventilation system (PCV) is coupled to the engine intake so that gases in the crankcase may be vented in a controlled manner from the crankcase. During non-boosted conditions (when intake manifold pressure (MAP) is less than barometric pressure (BP)), the positive crankcase ventilation system 16 draws air into crankcase 20 via a breather or crankcase ventilation tube 74 is coupled to the engine intake so that gasses in the crankcase may be vented in a controlled manner from the crankcase. A first end 101 of crankcase vent tube 74 may be mechanically coupled, or connected, to fresh air intake passage 13 upstream of compressor 50. Crankcase ventilation tube 74 may be coupled to fresh air intake passage 13 upstream of compressor 50. In some examples, the first end 101 of crankcase ventilation tube 74 may be coupled to fresh air intake passage 13 downstream of air filter 54 (as shown). In other examples, crankcase ventilation tube may be coupled to fresh air intake passage 13 upstream of air filter 54. A second end 102, opposite first end 101, of crankcase ventilation tube 74 may be mechanically coupled, or connected, to crankcase 28 via an oil separator 81.

The crankcase gases may include blow-by of combustion gases from the combustion chamber to the crankcase. The composition of the gases flowing through the conduit, including the humidity level of the gasses, may affect the humidity at locations downstream of the PCV inlet in the intake system.

In some embodiments, crankcase vent tube 74 may include a pressure sensor 61 coupled therein. Pressure sensor 61 may be an absolute pressure sensor or a gauge sensor. One or more additional pressure and/or flow sensors may be coupled to the crankcase ventilation system at alternate locations. In some examples, a compressor inlet pressure (CIP) sensor 58 may be coupled in intake passage 13 downstream of air filter 54 and upstream of compressor 50 to provide an estimate of the compressor inlet pressure (CIP).

Gas may flow through crankcase ventilation tube 74 in both directions, from crankcase 28 towards intake passage 13 and/or from intake passage 13 towards crankcase 28. For example, during non-boosted conditions, the crankcase ventilation system vents air out of the crankcase and into intake manifold 42 via conduit 74 which, in some examples, may include a one-way PCV valve 78 to provide continual evacuation of gases from inside the crankcase 28 before connection to the intake manifold 42. It will be appreciated that while the depicted example shows PCV valve 78 as a passive valve, this is not meant to be limiting, and in alternate embodiments, PCV valve 78 may be an electronically controlled valve (e.g., a powertrain control module (PCM) controlled valve) wherein a controller may command a signal to change a position of the valve from an open position (or a position of high flow) to a closed position (or a position of low flow), or vice versa, or any position there-between.

During boosted engine operation, the intake manifold air pressure may be greater than crankcase air pressure. As such, intake air may flow through crankcase ventilation tube 74 and into crankcase 28. Further, oil separator 81 may be disposed in ventilation tube 74 to remove oil from the stream of gasses exiting the crankcases during boosted operation.

While not shown, it will be appreciated that engine 10 may further include one or more exhaust gas recirculation passages for diverting at least a portion of exhaust gas from the engine exhaust to the engine intake. As such, by recirculating some exhaust gas, an engine dilution may be affected which may improve engine performance by reducing engine knock, peak cylinder combustion temperatures and pressure, throttling losses, and NOx emission. The one or more EGR passages may include a low pressure (LP)-EGR passage coupled between the engine intake upstream of the turbocharger compressor and the engine exhaust downstream of the turbine, and configured to provide LP-EGR. The one or more EGR passages may further include a high pressure (HP)-EGR passage coupled between the engine intake downstream of the compressor and the engine exhaust upstream of the turbine, and configured to provide HP-EGR. In one example, HP-EGR flow may be provided under conditions such as the absence of boost provided by the turbocharger, while an LP-EGR flow may be provided during conditions such as the presence of turbocharger boost and/or when an exhaust gas temperature is above a threshold. The LP-EGR flow through the LP-EGR passage may be adjusted via an LP-EGR valve while the HP-EGR flow through the HP-EGR passage may be adjusted via an HP-EGR valve (not shown).

Under some conditions, the EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

It will be appreciated that, as used herein, PCV flow refers to the flow of gases through the PCV line. This flow of gases may include a flow of crankcase gases only, and/or a flow of a mixture of air and crankcase gases.

Engine controller 12 is shown in FIG. 1 as a microcomputer, including microprocessor unit 108, input/output ports 110, an electronic storage medium for executable programs and calibration values shown as read only memory chip 112 in this particular example, random access memory 114, keep alive memory 116, and a data bus. Engine controller 12 may receive various signals from sensors coupled to engine 10, including measurement of inducted mass air flow (MAF) from mass air flow sensor 58; engine coolant temperature (ECT) from temperature sensor 46; exhaust gas air/fuel ratio from exhaust gas sensor 64; etc. Furthermore, engine controller 12 may monitor and adjust the position of various actuators based on input received from the various sensors. These actuators may include, for example, throttle 44, intake and exhaust valve system 40, 41, and PCV valve 78. Storage medium read-only memory 112 can be programmed with computer readable data representing instructions executable by processor 108 for performing the methods described below, as well as other variants that are anticipated but not specifically listed thereof.

Referring now to FIG. 2, a schematic diagram of an example cold air intake duct assembly is shown. The cold air intake duct assembly may include an ice ingestion feature. Since PCV condensation may collect in a cold air intake duct assembly, the ice ingestion feature may be positioned such that the ice ingestion feature accumulates the PCV condensation at a low point, relative to gravity and the ground on which a vehicle including the engine is positions, of the cold air intake. As such, the ice ingestion feature may be shaped to vary the rate of ice retention, thereby limiting the flow of PCV condensation to the engine, as described further with regard to FIG. 2.

Cold air intake duct assembly 200 is configured to supply air to an engine, such as the engine of FIG. 1, and includes an air intake duct body 225, air inlet 201, air outlet 202 and a positive crankcase ventilation (PCV) port 203. Air inlet 201 and air outlet 202 may include flexible couplings. As such, the flexible couplings enable air inlet 201 and air outlet 202 to flex to a greater degree than the cold air intake duct body 225. Air inlet 201 draws air into the duct via an air filter positioned upstream of the air inlet (not shown), while air outlet 202 provides air to the engine. An arrow 224 indicates the air flow through cold air intake duct body 225. In one example, air outlet 202 may be in fluidic communication with downstream components such as a throttle, a compressor, etc. As shown, air outlet 202 may be positioned downstream of a curved section 207 of the cold air intake duct body 225. The curved section 207 of the cold air intake duct body 225 may extend in a vertical direction. A PCV port 203 is also shown in cold air intake duct body 225. A PCV port 203 may draw gases from the engine crankcase into the engine cylinders to be combusted, thereby reducing emissions of hydrocarbons. An arrow 204 indicates the air flow between the crankcase and PCV port 203. Further, cold air intake duct body 225 does not include a filter or a bypass. As such, the interior of the cold air intake duct body 225 includes open space from a top wall 205 to a bottom wall 206 of the cold air intake duct assembly 200, as described below with regard to FIGS. 4-8. Herein, a top wall and/or bottom wall may both be the whole wall including an inner surface and an outer surface.

Additionally, the air intake duct wall may include an inner surface wherein an ice ingestion feature may be formed by an indent extending away from the inner surface vertically downward. As such, the top of the indent may be flush with the inner surface and not extending vertically upward past the inner surface into an engine air path of the air intake duct. For example, cold air intake duct body 225 includes an ice ingestion feature 208. The ice ingestion feature 208 may be positioned vertically below the PCV port 203. A vertical axis 222, relative to gravity, is provided for reference, to illustrate that the ice ingestion feature is below, with respect to a vertical axis, the air duct (e.g. with respect to gravity and a road surface on which a vehicle having the ice ingestion feature is positioned). Ice ingestion feature 208 has an overall opening length 210 that may be parallel to a center axis line 209. As such, the opening may be constant along its length downstream of the air inlet 201. Further, width 211 may be perpendicular to the bottom 206 of the cold air intake duct.

Further, the bottom wall may include a plurality of indents, at least two of which contain a different volume. As such, the plurality of indents may be formed by a plurality of compartments. For example, ice ingestion feature 208 may further include a plurality of compartments, which in one example may be shaped as villi, 212, 213, 214, 215, 216, 217, 218, 219, 220, and 221 positioned at the bottom wall 206 of the cold air intake duct, as described below with reference to FIGS. 2-9. As such, the plurality of compartments 212, 213, 214, 215, 216, 217, 218, 219, 220, and 221 may protrude perpendicular to the bottom wall 206 of the cold air intake duct. In another example, an ice ingestion feature 208 may include a plurality of grooves positioned in the interior of the cold air intake duct. As such, the plurality of grooves may be positioned on a bottom wall 206 of the cold air intake duct body 225, as described below with reference to FIGS. 10A and B. In one example, the plurality of compartments and/or grooves may be formed with varying widths, depths and/or angles such that the compartments and/or grooves may have varying surface areas. As such, by including compartments and/or grooves with different surface areas in the ice ingestion feature, the amount of time the ice remains in the ice ingestion feature will be varied. Thus, the amount of ice released from the ice ingestion feature may be based on a condensation or ice retention rate, for example, as the intake duct warms up following engine restart.

As shown in FIG. 2, at least some compartments narrow as they extend vertically downward. Further, the compartments each have closed ends such that the air intake duct is not open to atmosphere via any of the compartments. For example, the plurality of compartments of the ice ingestion feature 208 may be positioned in such a way that the compartments may protrude perpendicularly from the bottom wall 206 of the cold air intake duct body 225. In one example, the compartments may be directly coupled to the bottom of the cold air intake duct. As such, the plurality of compartments may be draft molded into shape. In another example, the compartments may be draft molded into the plastic. Additionally, the plurality of compartments may include varying widths, depths and angles such that the condensation (e.g. water and/or ice) may be more slowly ingested by the compressor without damage to the impeller blades or blocking the throttle plate from closing, as described further below with regard to FIGS. 3-9.

The cutting plane 223 defining the cross-section shown in FIG. 3 and FIGS. 5-8 is illustrated in FIG. 2. The cutting plane 226 defining the cross-section shown in FIG. 4 is also illustrated in FIG. 2.

Figure 3:
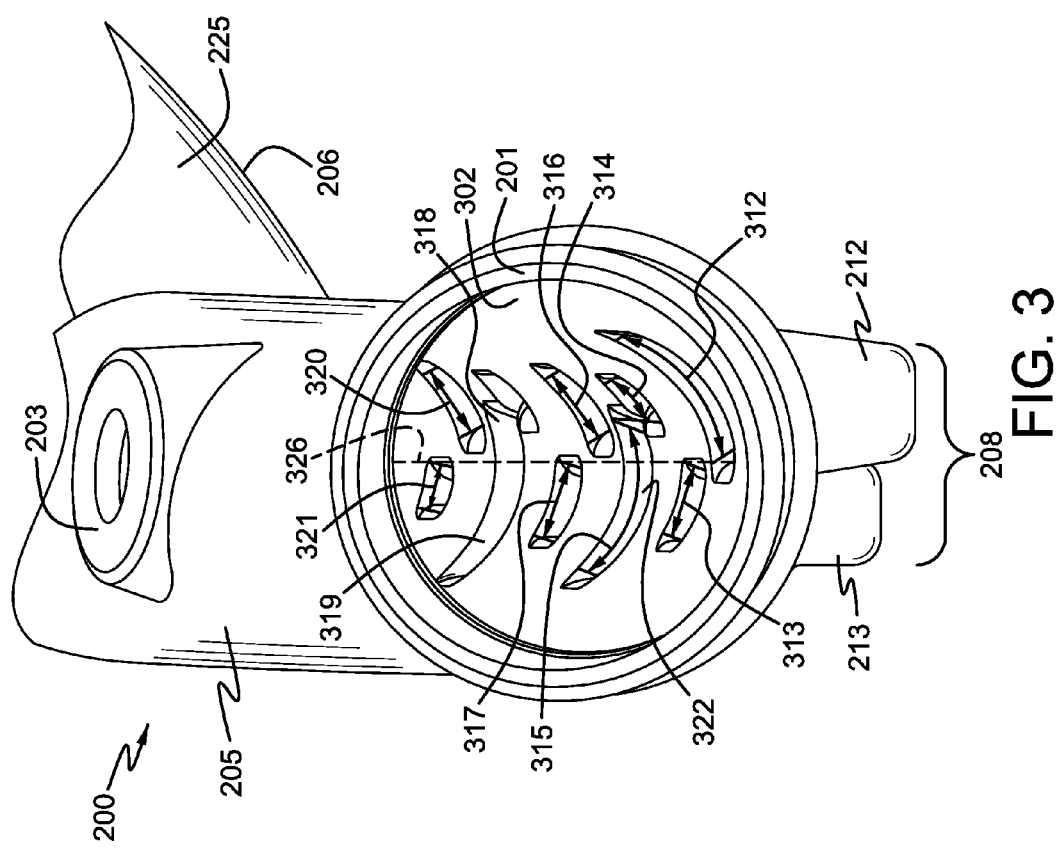
FIG. 3 shows a cross-sectional view of the cold air intake duct assembly including apertures of an ice ingestion feature.

Referring now to FIG. 3, a cross-sectional view of the cold air intake duct assembly 200 is shown, as described above with regard to FIG. 2. Specifically, a cross-sectional view looking down air inlet 201 is shown. The cold air intake duct body 225 may include a top wall 205, bottom wall 206, and PCV port 203. A cold air intake duct body 225 may include an ice ingestion feature 208 including a plurality of indents including a plurality of compartments or villa positioned at a bottom 206 of the cold air intake duct. In this example, the body of compartments 212 and 213 are shown. As such, compartments 212 and 213 may be formed in the cold air intake body 225. Further, cold air intake body 225 includes an interior wall 302. In one example, an interior wall 302 of a cold air intake duct may include a plurality of compartment apertures positioned in the bottom wall 206 of the cold air intake duct body 225. As such, the bottom wall includes an interior and outer wall such that the compartment aperture is positioned in the interior and outer wall (e.g. the aperture leads into the compartment). In one example, compartment apertures 312, 313, 314, 315, 316, 317, 318, 319, 320, and 321 may be formed into the bottom wall 205 of the cold air intake duct body 225. The apertures may extend longitudinally along the bottom wall 206 of the cold air intake duct assembly. In an additional example, when looking down the air inlet 201 along a central axis 326, the compartment apertures 313, 313, 314, 315, 316, 317, 318, 319, 320, and 321 may be positioned parallel to each other. Further, the plurality of apertures may be positioned in the area of a plane perpendicular to a central axis of the air intake duct body. In another example, the compartment apertures may not be positioned on a center axis 326 such that the apertures may be offset to the right or left of the center axis 326 in the bottom wall 206 of the cold air intake duct.

Further, the plurality of indents each include an aperture positioned in the intake duct wall, with at least one aperture having a larger area than at least one other aperture. In one example, aperture 312 may have a large diameter as compared to the diameters of apertures 313, 314, 316, 317, 320, and/or 321. In another example, apertures 313, 314, 316, 317, and 320 may have a medium diameter as compared to a large aperture 312 and a small aperture 321. In yet another example, some compartments may cross-connect such that an aperture may be a combination of two apertures from two separate compartments. For example, aperture 314 and aperture 315 cross-connect such that they form a combined aperture 322. In addition, aperture 318 and 319 may be another example of two compartments that cross-connect to form a combined aperture. In another example, the compartment apertures may be formed such that the apertures have irregular shapes.

Figure 4:
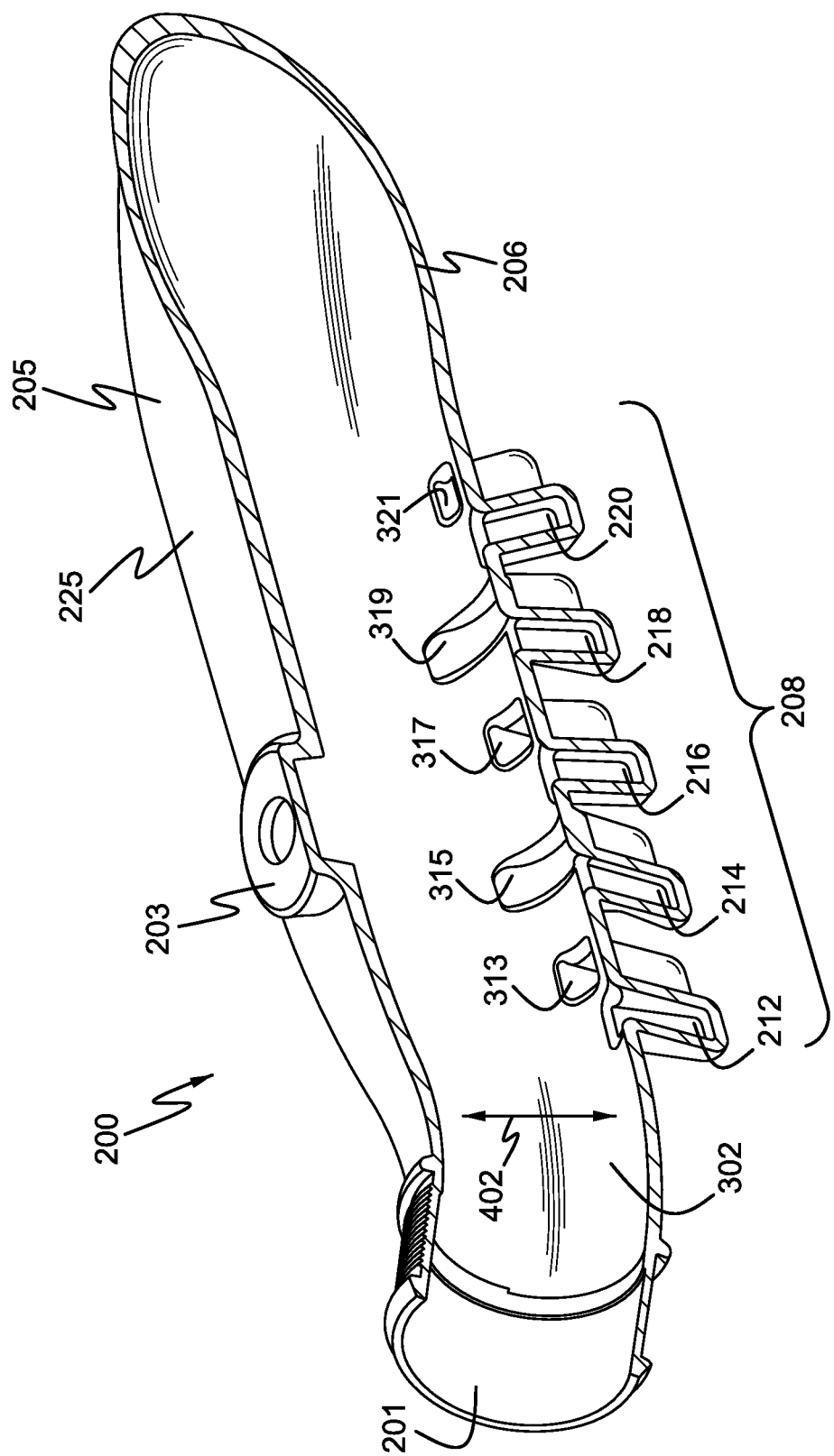
FIG. 4 shows a cross-section view of the cold air intake duct assembly including an interior view of the ice ingestion feature.

Referring now to FIG. 4, a cross-sectional view of an engine cold air intake duct assembly is shown. In particular, cross-section 226 of cold air intake assembly 200 is shown. As such, cold air intake duct body 225 includes a top wall 205, a bottom wall 206, and an interior wall 302. Further, cold air intake duct assembly includes an air inlet 201, PCV port 203, and an ice ingestion feature 208. Cold air intake duct body 225 does not include a filter or bypass. Thus, cold air intake duct body 225 includes an open space from a top wall 205 to a bottom wall 206, as shown by arrow 402. A top and bottom wall includes both an inner surface and an outer surface. As such, the inner surface of a top and bottom wall may define the open space shown by arrow 402. In this example, a cross-section of the ice ingestion feature 208 including the body of compartments 212, 214, 216, 218, 220 as well as apertures 313, 315, 317, 319, and 321 are shown. Apertures 313, 315, 317, 319, and 321, for example, may have varying diameters, as described above with regard to FIG. 3. Further, ice ingestion feature 208 may be formed in the bottom wall 206 of the cold air intake such that each compartment may have varying widths, depths, and/or angles, as described below with regard to FIGS. 5-8.

In this figure, the cross-sectional view of the compartments demonstrates that each compartment may have varying widths, depths, and/or angles. As such, the bottom wall of the cold air intake duct body includes a plurality of the indents, at least two of which contain a different volume. As such, a compartment with a large volume may have a large surface area. Since the ice ingestion feature includes compartments with different surface areas, the amount of time the ice remains in the ice ingestion feature may be varied. As such, a larger volume or larger surface area may have a longer ice retention rate. In one example, compartment 212 may have a larger surface area than compartment 216. In another example, aperture 315 may have a larger diameter than aperture 313. As such, compartment 212 and/or aperture 315 may have an increased ice retention rate. Further, a plurality of compartments may have a wide or narrow aperture as compared to the bottom wall of the compartment. In another example, the plurality of compartments may be positioned at a set range of angles, such as between 10-40 degrees, or between 15 and 35 degrees, or others. Specifically, a plurality of compartments may be angled such that the compartments may be positioned against a flow direction of an engine air path through the cold air intake duct. As such, the ice retention rate may be increased. Conversely, a plurality of compartments may be angled such that the compartments are positioned with a flow direction of an engine air path, thereby having a decreased ice retention rate. In one example, a plurality of compartments may be angled over a range of angles including an angle between 0° and 90°, excluding 0° and 90°. In another example, a plurality of compartments may be angled over a range of angles including an angle between 90° and 180°, excluding 90° and 180°.

In another example, the engine cold air intake duct bottom wall may include a plurality of compartments formed with an ice-tray structure. As such, at least some compartments may be irregularly formed with respect to other compartments. Further, the ice-tray structure may be formed by a plurality of compartments extending away from the bottom vertically downward. In another example, at least some of the compartments may narrow as they extend vertically downward. Further, at least some of the compartments may widen as they extend vertically downward. For example, compartments 212, 214, 216, 218, 220 and apertures 313, 315, 317, 319, and 321 of the ice ingestion feature 208 may be arranged along a bottom wall 206 of the cold air intake duct body 225 in an ice-tray like fashion. In another example, compartment 212 may be irregularly formed as compared to compartment 214. As such, compartment 212 may have a larger volume such that the compartment may be available to hold more of the condensation (e.g. water and/or ice) as compared to compartment 214.

Figure 5:
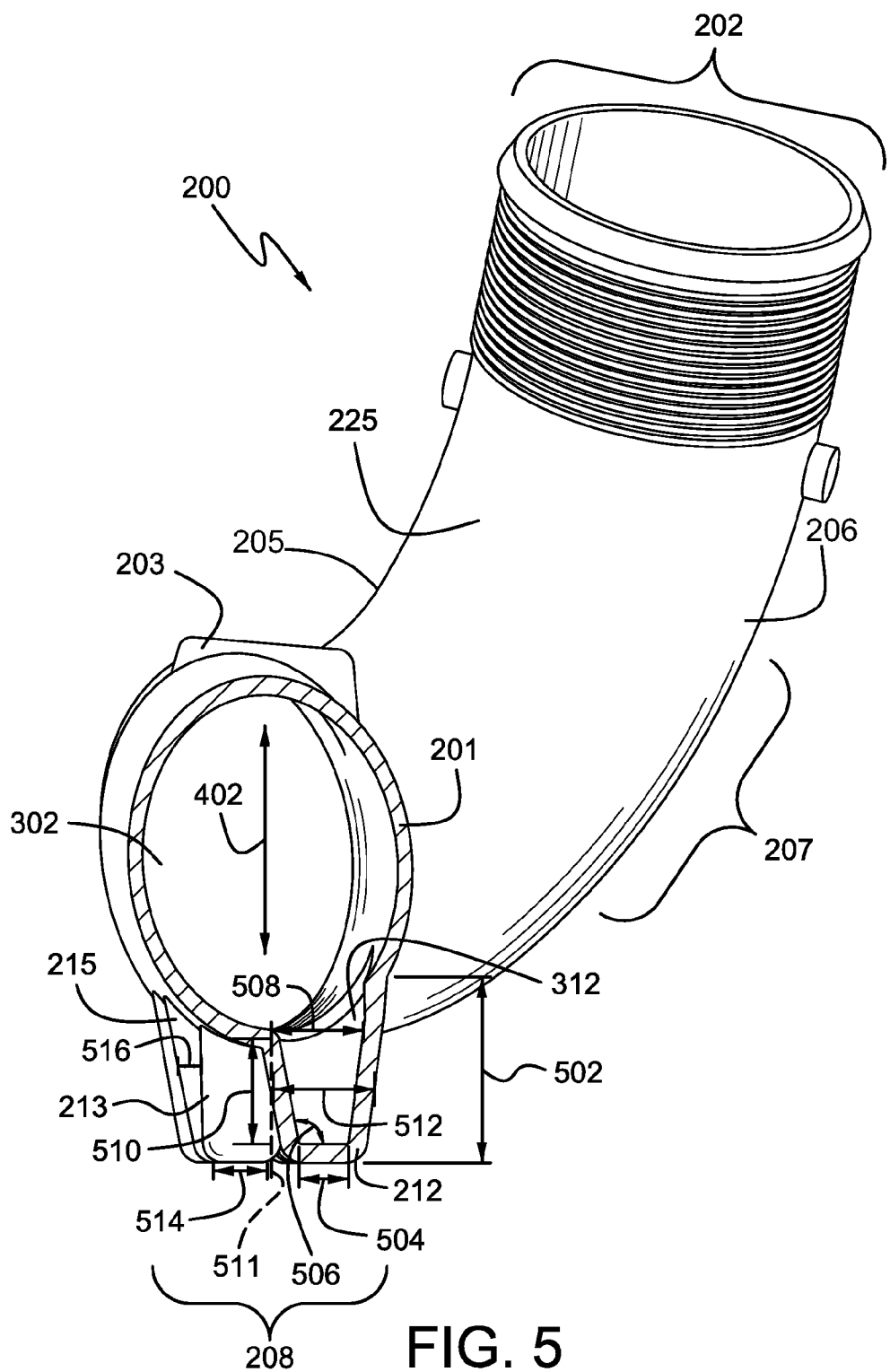
FIG. 5 shows a cross-section view of the cold air intake duct assembly including a compartment of an ice ingestion feature.

FIG. 5 shows a cross-sectional view of the cold air intake duct assembly 200, as described above with regard to FIG. 2. Specifically, a cross-sectional view looking down air inlet 201 such that interior wall 302 and open space 402 are shown. As such, cold air intake duct body 225 includes a top wall 205, a bottom wall 206, PCV port 203, and curved section 207. In this example, an ice ingestion feature 208 including a body of a compartment 212 is shown. As such, a body of a compartment 212 may include an outside wall 502, inside wall 510, bottom wall 504, and aperture 312. The compartment 212, as well as remaining compartments may be fully enclosed such that gas only travels into or out of the compartment via the aperture 312 of each compartment. In one example, outside wall 502 may have a larger diameter than inside wall 510. In another example, bottom wall 504 may have a smaller diameter than aperture 312 diameter 508. In an additional example, bottom wall 504 may be disposed to inside wall 510 such that the walls form an angle 506. In this example, angle 506 may be larger than 90°. In another example, a compartment may be angled over a range of angles including an angle between 90° and 180°. In this way, compartment 212 may have a large surface area, thereby having a large ice retention rate.

Further, a compartment may be axially offset from a centerline. For example, compartment 212 may be offset to the right of centerline 511 by diameter 512. In another example, compartment 213 may be offset to the left of centerline 511 by diameter 514. In another example, compartment 215 may be offset to the left of compartment 213 by diameter 516.

Figure 6:
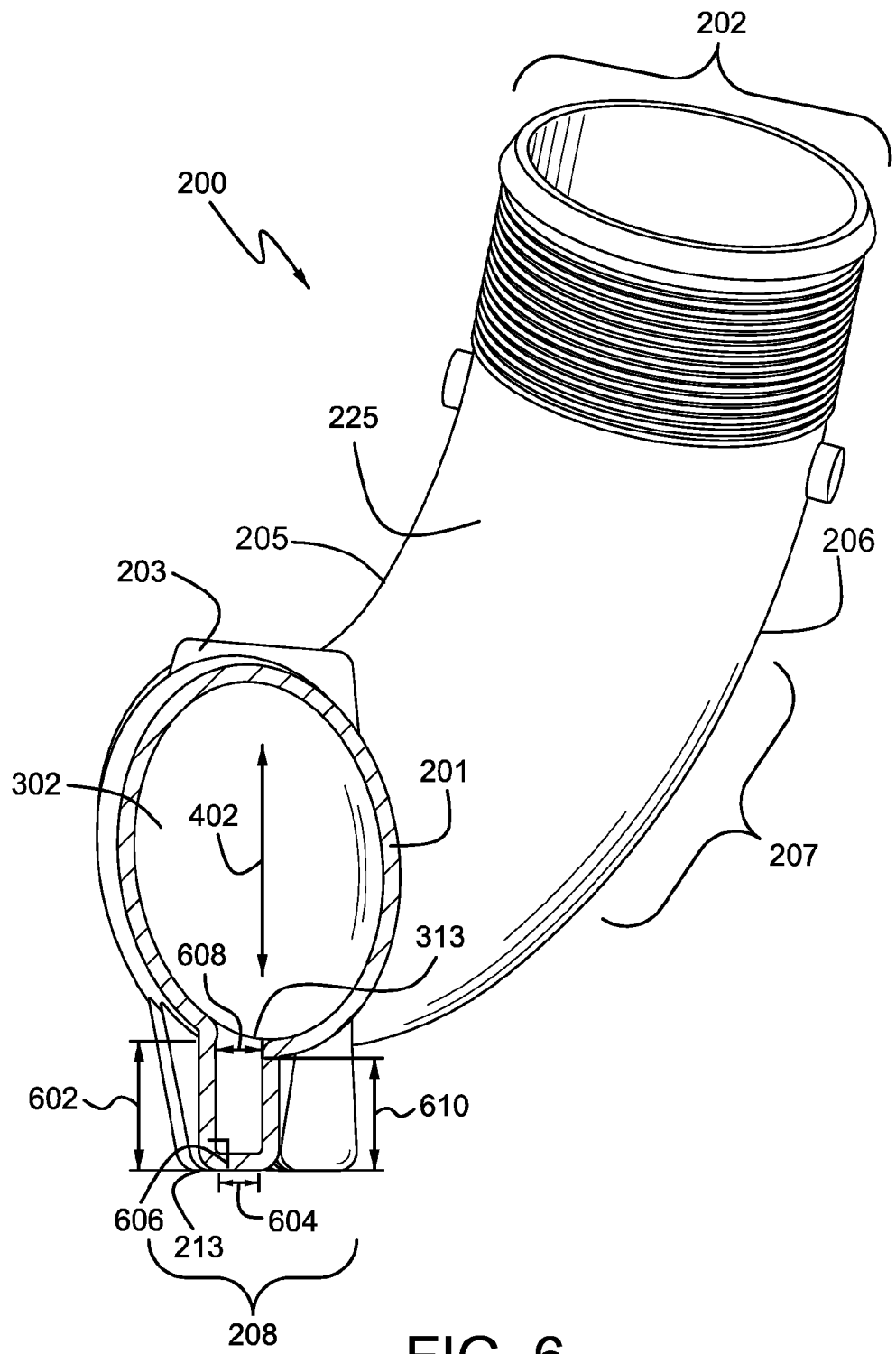
FIG. 6 shows a cross-section view of the cold air intake duct assembly including a compartment of an ice ingestion feature.

FIG. 6 shows a cross-sectional view of the cold air intake duct assembly 200, as described above with regard to FIG. 2. Specifically, a cross-sectional view looking down air inlet 201 such that cold air intake duct body 225 including interior wall 302 and open space 402 are shown. As such, cold air intake duct body 225 includes a top wall 205, a bottom wall 206, PCV port 203, and curved section 207. In this example, an ice ingestion feature 208 including a body of a compartment 213 is shown. As such, a body of compartment 213 may include an outside wall 602, inside wall 610, bottom wall 604, and aperture 313. In one example, outside wall 602 may have a larger diameter than inside wall 610. In another example, bottom wall 604 may have the same diameter as aperture 312 diameter 608. In an additional example, bottom wall 604 may be disposed to outside wall 602 and inside wall 610. As such, outside wall 602 and bottom wall 604 may be positioned such that the walls form a 90° angle 606. Further, inside wall 610 and bottom wall 604 may be positioned such that the walls also form a 90° angle. In this way, compartment 213 may have a smaller surface area than compartment 212, thereby having a decreased ice retention rate as compared to compartment 212, as described above with regard to FIG. 5.

Figure 7:
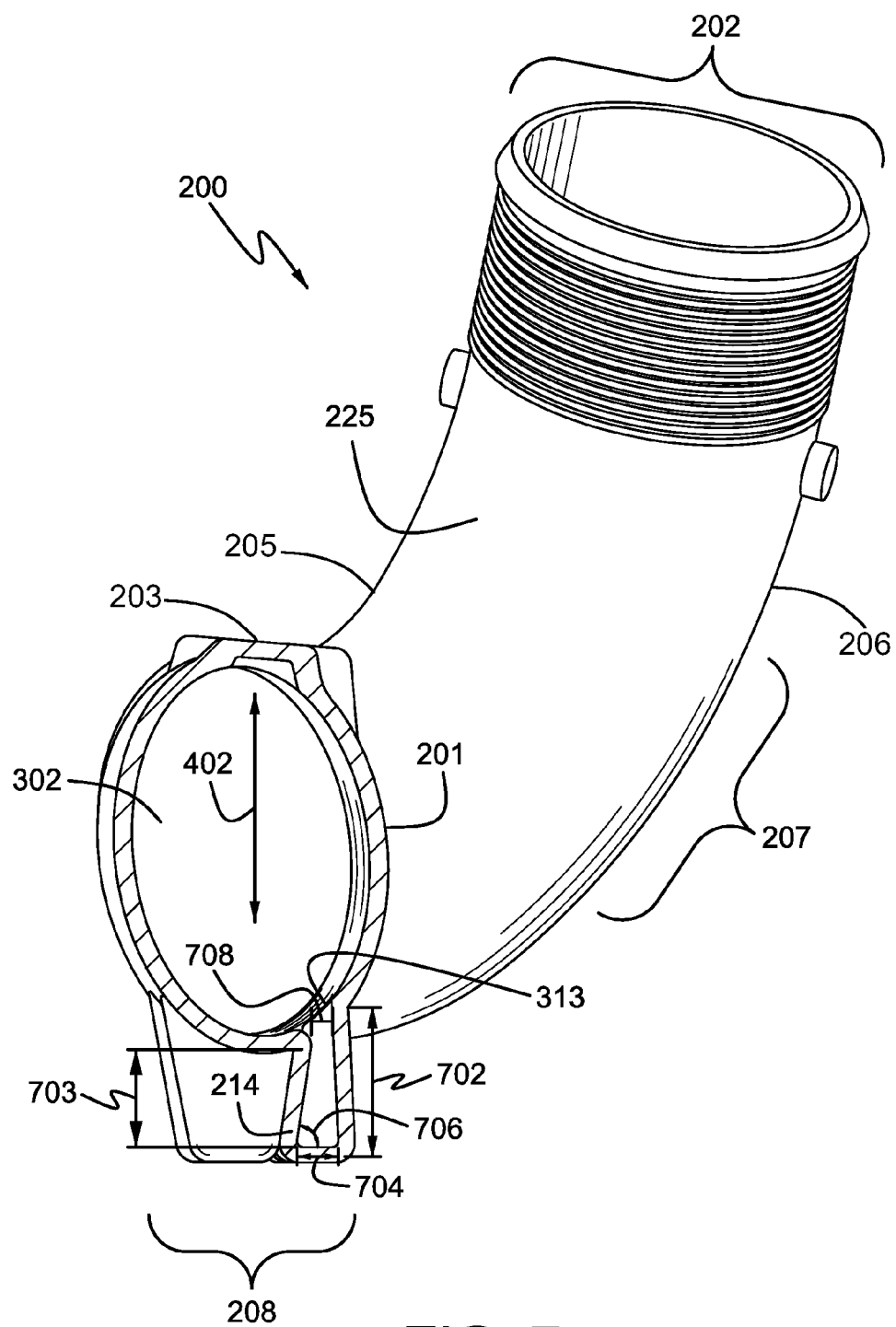
FIG. 7 shows a cross-section view of the cold air intake duct assembly including a compartment of an ice ingestion feature.

FIG. 7 shows a cross-sectional view of the cold air intake duct assembly 200, as described above with regard to FIG. 2. Specifically, a cross-sectional view looking down air inlet 201 such that cold air intake duct body 225 including interior wall 302 and open space 402 are shown. As such, cold air intake duct body 225 includes a top wall 205, a bottom wall 206, PCV port 203, and curved section 207. In this example, an ingestion feature 208 including a body of a compartment 214 is shown. As such, a body of compartment 214 may include an outside wall 702, an inside wall 703, bottom wall 704, and aperture 314. In on example, outside wall 702 may have a larger diameter than inside wall 703. In another example, bottom wall 704 may have a larger diameter than aperture 314 diameter 708. In an additional example, bottom wall 704 may be disposed to outside wall 702 and inside wall 710. As such, outside wall 702 and bottom wall 704 may be positioned such that the walls form a 90° angle. Further, inside wall 703 and bottom wall 704 may be positioned such that the walls form an angle 706 that may be less than 90°. In this way, compartment 214 may have a small surface area, thereby having a decreased ice retention rate.

Figure 8:
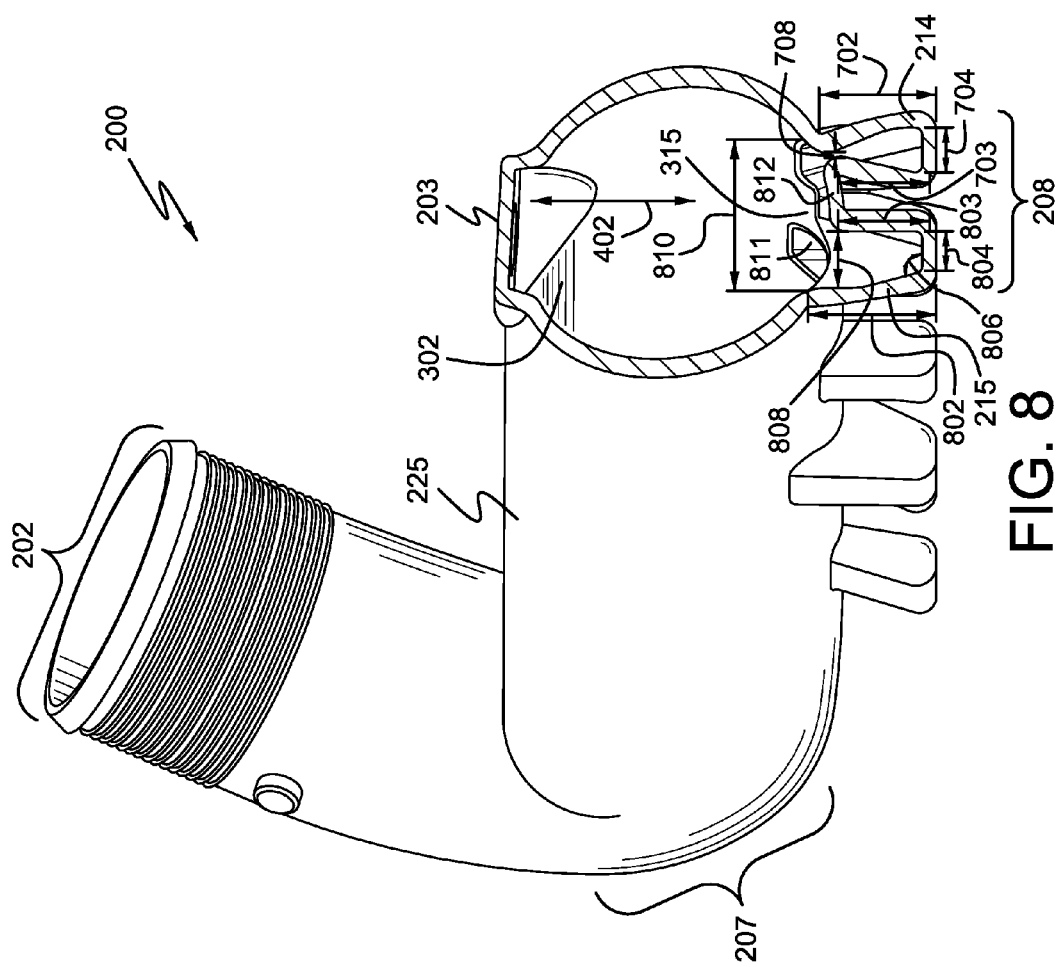
FIG. 8 shows a cross-section view of the cold air intake duct assembly including a cross-connected compartment of an ice ingestion feature.

FIG. 8 shows a cross sectional view of the cold air intake duct assembly 200, as described above with regard to FIG. 2. Specifically, a cross-sectional view looking down cold air intake assembly 200 such that cold air intake duct body 225 including interior wall 302 and open space 402 is shown. Further, cold air intake duct body 225 includes an air outlet 202, curved section 207, and a PCV port 203. In this example, an ingestion feature 208 including a body of compartment 214 and a body of compartment 215 is shown. As such, a compartment 214 and a compartment 215 may cross-connect such that they have a same aperture 811. Further, compartment 214 and compartment 215 may be formed to be separate compartments such that inside wall 703 of compartment 214 and inside wall 803 of compartment 215 are parallel and joined by a common top wall 812 in order to form aperture 811. Compartment 214 has an outer wall 702, inside wall 703 and bottom wall 704, as described above with regard to FIG. 7. Compartment 215 may include an outer wall 802, inner wall 803, and bottom wall 804. In this example, an aperture 315 diameter 808 may be larger than bottom wall 804. Further, outer wall 802 may be disposed to bottom wall 804 such that, when joined, the walls form an angle 806 that may be greater than 90°. In an additional example, the aperture 811 diameter 810 may include the diameter of common top wall 812, aperture diameters 708 and 808. In this way, cross-connected compartments 214 and 215 may have a large surface area, thereby having a longer ice retention rate.

Figure 9:
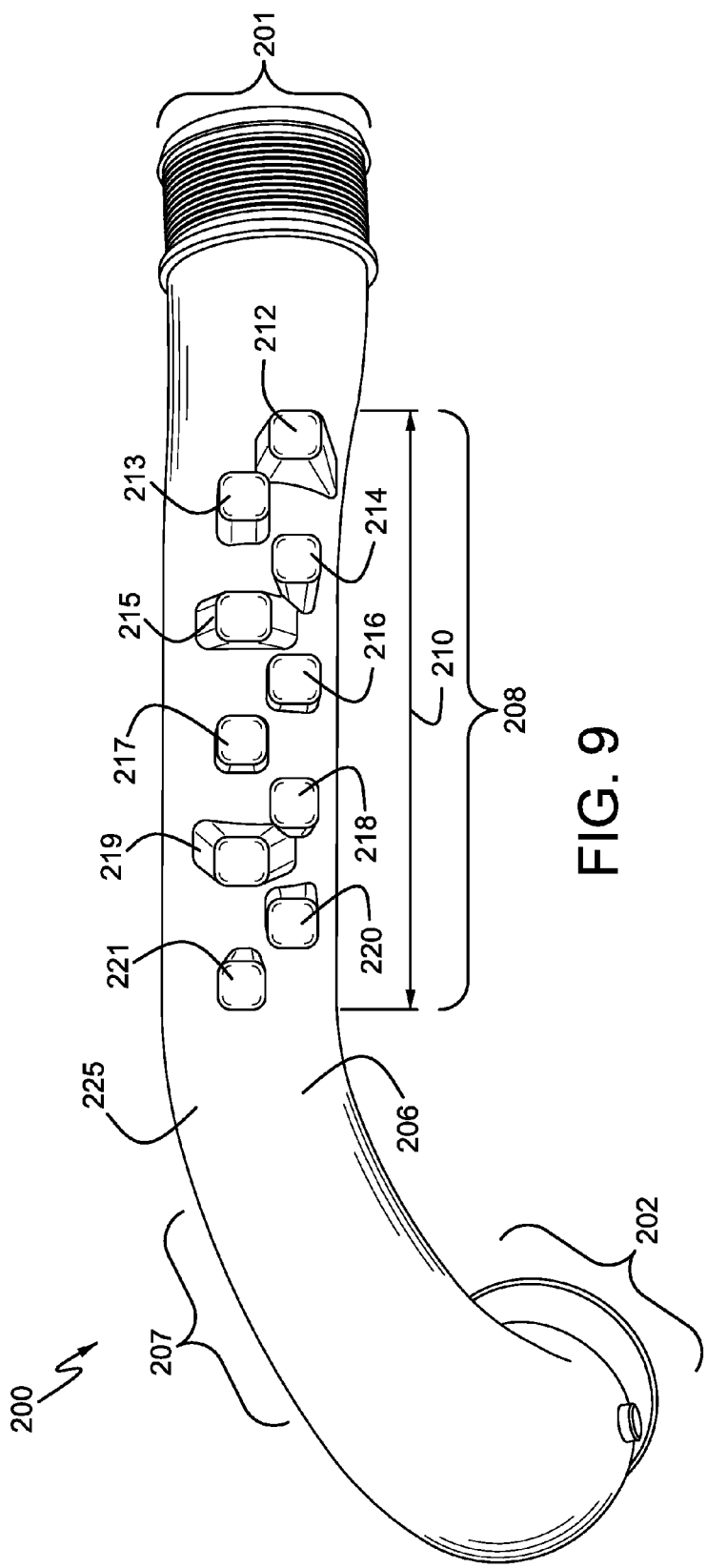
FIG. 9 shows a bottom view of the cold air intake duct assembly including an ice ingestion feature.

FIG. 9 shows a bottom view of the cold air intake duct assembly 200, as described above with regard to FIG. 2. A cold air intake duct body 225 including an air inlet 201, air outlet 202, and curved section 207. As shown, air outlet 202 may be positioned downstream of a curved section 207 of the cold air intake duct. Further, cold air intake duct assembly 200 includes an ice ingestion feature 208. Ice ingestion feature 208 may be positioned on a bottom wall 206 of the cold air intake duct. As such, the ice ingestion feature 208 may have a diameter 210 which may be constant along its length downstream of the air inlet 201. In one example, ice ingestion feature 208 includes a plurality of compartments or villi. Additionally, the bottom walls of compartments or villi 212, 213, 214, 215, 216, 217, 218, 219, 220, and 221 are shown. As mentioned above with regard to FIGS. 2-8, the widths of the bottom wall of the compartments may vary such that each individual compartment may have a different bottom wall diameter. For example, the diameter of a bottom wall of compartment 212, 215, and 219 may have a larger diameter than the bottom walls of 213, 214, 216, 217, 218, 220, and 221. In another example, the bottom wall of compartments 216, 218, and 221 may have a smaller diameter of a bottom wall than the diameter of the bottoms wall of compartments 212, 215, and 219. In another example, the diameter of the bottom wall of compartments 212 may have the same diameter as the bottom wall of 215 and 219.

Referring now to FIG. 10A, a schematic diagram of a cold air intake duct including an ice ingestion feature is shown. Cold air intake duct assembly 1000 is configured to supply air to an engine. Cold air intake duct assembly 1000 includes cold air intake duct body 1008, an air inlet 1001, air outlet 1002, and a positive crankcase ventilation (PCV) port 1003. Air inlet 1001 and air outlet 1002 may include flexible couplings. Air inlet 1001 draws air into the duct via an air filter positioned upstream of the air inlet (not shown), while air outlet 1002 provides air to the engine. An arrow 1010 indicates the air flow through cold air intake duct body 1008. In one example, air outlet 1002 may be in fluidic communication with downstream components such as a throttle, a compressor, etc. The curved section 1007 of the cold air intake duct may extend in a vertical direction. A PCV port 1003 is also shown in cold air intake duct body 1008. A PCV port 1003 may draw gases from the engine crankcase into the engine cylinders to be combusted, thereby reducing emissions of hydrocarbons. An arrow 1004 indicates the air flow between the crankcase and PCV port 1003. Further, cold air intake duct body 1008 does not include a filter or a bypass. As such, the interior of the cold air intake duct body 1008 includes open space from a top wall 1005 to a bottom wall 1006 of the cold air intake duct body, as described below with regard to FIG. 10B. The cutting plane 1023 defining the cross-section shown in FIG. 10B is illustrated in FIG. 10A.

Now referring to FIG. 10B, a cross sectional view of the cold air intake duct assembly 1000 is shown, as described above with regard to FIG. 10A. As such, cold air intake duct body 1008 includes a top wall 1005, bottom wall 1006, interior 1024. The interior 1025 of the cold air intake duct includes an open space from a top wall 1005 and a bottom wall 1006, as shown by arrow 1024. Additionally, cold air intake duct body 1008 may also include an ice ingestion feature 1026. The ice ingestion feature 1026 may be positioned vertically below the PCV outlet 1003 (not shown). A vertical axis 1022, relative to gravity, is provided for reference, to illustrate that the ice ingestion feature is below, with respect to a vertical axis, the air duct (e.g. with respect to gravity and a road surface on which a vehicle having the ice ingestion feature is positioned). However, other vertical axis orientations have been contemplated. Ice ingestion feature 1026 has a width 1038 that may be perpendicular to the bottom 1006 of the cold air intake duct.

Further, cold air intake duct body 1008 includes an ice ingestion feature 1026. An ice ingestion feature may include one or more grooves along an inner surface of the engine air intake duct wall substantially aligned with a flow direction through the duct. In this example, an ice ingestion feature 1026 may include a plurality of grooves 1028, 1030, 1032, 1034, and 1036 positioned at a bottom wall 1006 in the interior 1024 of the cold air intake duct body 1008. Further, one or more grooves may be formed by one or more protrusions extending vertically past the inner surface into an engine air path of the air intake duct. For example, the ice ingestion feature 1026 may include a plurality of protrusions 1027, 1029, 1031, 1033, 1035, and 1037. In one example, a first protrusion may be disposed parallel to a second protrusion. As such, protrusion 1027 may be parallel to 1029 such that wall 1040 and wall 1041 form a groove 1028. Further, the grooves may be irregularly formed with respect to other grooves. As such, at least one groove may have a larger area than at least one other groove. In one example, a first groove may be less than a diameter of a second groove. In this way, a narrow diameter of a groove may retain ice in an ice ingestion feature for a short duration of time. Additionally, a first groove may be greater than a diameter of a second groove. Therefore, a wide diameter of a groove may retain ice in an ice ingestion feature for a long duration of time. Based on the diameter of the grooves and protrusions, the ice retention rate may vary, thereby preventing a large amount of ice and/or water from being ingested by the compressor. Further, modifying the ice retention rate may prevent the throttle body from being blocked and/or sticking open. It should be noted that the ice-tray like projections may also extend vertically past the inner surface into an engine air path of the air intake duct, similar to that shown in FIG. 10B.

In another example, at least some grooves may narrow as they extend vertically, whereas at least some grooves may widen as they extend vertically downward. As such, a plurality of grooves may be angled over a range of angles including an angle between 0° and 90°. In another example, a plurality of grooves may be angled over a range of angles including an angle between 90° and 180°. Further, groove walls may be positioned at angles greater than 90°, thereby creating a channel with a bottom diameter greater than a top diameter. In another example, groove walls may be positioned at angles less than 90°, thereby creating a groove with a bottom diameter less than a top diameter. In this way, an angle 1043 forms a groove 1034, such that the top diameter may be larger than a bottom diameter. In another example, the groove walls may form a 90° angle perpendicular to a bottom of a cold air intake duct body. As such, a groove 1028 may have a bottom diameter equal to a top diameter.

FIG. 11 shows a method 1100 for retaining ice in a cold air intake duct including an ice ingestion feature. The method 1100 may be implemented via systems and components described above with regard to FIGS. 1-10.

At 1102 the method includes flowing crankcase gasses from a PCV port to a cold air intake duct upstream of an engine cylinder. In one example, the PCV port may be in communication with a sealed crankcase. As such, the flow of gases may include a flow of intake air only, a flow of crankcase gases only, and/or a flow of a mixture of air and crankcase gases. At 1104, the method includes collecting condensate in a plurality of indents positioned in a bottom wall of an air intake duct. In another example, the ice ingestion feature may include a plurality of indents which may be formed by a plurality of compartments and/or grooves, as described above with regard to FIGS. 2-10. As such, the liquid may accumulate and remain in the compartments and/or grooves. Following an engine shut-off the liquid may be frozen. At 1106, the method includes flowing intake air through the cold air intake duct. In one example, flowing intake air and crankcase gas from the air intake duct to a compressor, wherein the intake air intake duct is positioned upstream of a throttle and the compressor. At 1108, the method includes thawing the compartments during engine operation at different rates. For example, air flow flowing through the cold air intake duct may be warmed following an engine restart, thereby causing the frozen condensate to thaw. As such, ice retained in the compartments and/or grooves may melt or become dislodged from the ice ingestion feature. Therefore, at 1110, the condensation may be released from the compartments resulting in the engine ingesting water from the compartments based on engine operating conditions. The ice may be dislodged from the ice ingestion feature based on an ice retention rate. In one example, an ice retention rate may be determined by the geometry of the ice ingestion feature including the width, depth, and/or angle of the compartments and/or grooves. As such, a limited amount of condensation may enter the compressor over time, thereby preventing damage to the turbocharger and/or throttle body. It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
   an engine intake air duct with a bottom including a plurality of protrusions extending vertically past an inner surface into an engine air path of the intake duct, wherein one or more of the protrusions forms one or more grooves, at least some of the grooves irregularly formed with respect to other grooves.

2. The system of claim 1, wherein the one or more protrusions and the one or more grooves forms an ice ingestion feature along the inner surface the intake air duct.

3. The system of claim 1, wherein the one or more grooves are substantially aligned with a flow direction through the duct.

4. The system of claim 2, wherein a diameter of a first groove is less than a diameter of a second groove, the first groove retaining ice in the ice ingestion feature for a short duration of time.

5. The system of claim 2, wherein a diameter of a first groove is greater than a diameter of a second groove, the first groove retaining ice in the ice ingestion feature for a long duration of time.

6. The system of claim 2, wherein at least some grooves narrow as they extend vertically downward; and wherein at least some grooves widen as they extend vertically downward.

7. The system of claim 1, wherein the intake air duct includes ice-tray like projections extending vertically past the inner surface of the intake air duct.

8. The system of claim 2, wherein the one or more grooves are positioned at angles between 0 degrees and 90 degrees.

9. The system of claim 2, wherein the one or more grooves are positioned at angles between 90 degrees and 180 degrees.

10. The system of claim 2, wherein a diameter of a first groove is equal to a diameter of a second groove.

11. The system of claim 2, wherein the intake air duct is positioned upstream of a throttle and a compressor.

12. The system of claim 11, wherein a PCV port is positioned vertically above the ice ingestion feature.

13. An air intake duct assembly for an engine, comprising:
    an air intake duct including an ice ingestion feature positioned vertically below a PCV outlet; wherein the ice ingestion feature includes one or more grooves positioned at a bottom wall of the air intake duct body; wherein the one or more grooves are formed by one or more protrusions extending vertically past an inner surface into an air path of the air intake duct; wherein at least some of the grooves are irregularly formed with respect to other grooves.

14. The engine air intake duct assembly of claim 13, wherein the duct assembly includes a cold air intake duct, an air outlet and open space from a top wall to the bottom wall of the duct body, wherein the air outlet is in positioned upstream of a throttle and compressor.

15. The engine air intake duct assembly of claim 13, wherein the air intake duct body does not include a filter or bypass.

16. The engine air intake duct assembly of claim 13, wherein the ice ingestion feature has a width that is perpendicular to the bottom wall of the cold air intake duct.

17. The air intake duct assembly of claim 14, wherein at least one groove has a different diameter from a second groove.

18. The air intake duct assembly of claim 13, wherein a first protrusion is disposed parallel to a second protrusion, wherein at least one groove has a larger area than at least one other groove.

19. The engine air intake duct assembly of claim 17, wherein an ice retention rate of the ice ingestion feature varies based on the diameter of the grooves and protrusions.

20. The engine air intake duct assembly of claim 19, wherein the variance of the ice retention rate prevents the throttle from being blocked and/or sticking open.

* * * * *